United States Patent [19]
Suzuki et al.

[11] Patent Number: 5,637,271
[45] Date of Patent: Jun. 10, 1997

[54] METHOD OF PRODUCING NON-WOVEN FABRICS FOR USE IN FILTERS

[75] Inventors: Makoto Suzuki; Hidetoshi Takeuchi, both of Yokohama; Toshikazu Kamei, Isehara, all of Japan

[73] Assignee: Tonen Chemical Corporation, Tokyo, Japan

[21] Appl. No.: 526,682

[22] Filed: Sep. 11, 1995

[51] Int. Cl.$^6$ .................................................. B29C 37/00
[52] U.S. Cl. .................................................. 264/160; 264/175
[58] Field of Search .................................................. 264/175, 160

[56] References Cited

U.S. PATENT DOCUMENTS 4,342,805 8/1982 McCartney .................................................. 428/151
4,731,135 3/1988 Tani et al. .................................................. 156/62.6

*Primary Examiner*—Christopher Raimund
*Attorney, Agent, or Firm*—Sughrue, Mion, Zinn, Macpeak & Seas

[57] ABSTRACT

A non-woven fabric for filtering medium having graded packing density. The packing density is the lowest at one surface, and gradually increases towards the other surface at which the packing density becomes the greatest. The gradually increasing packing density and the nearly constant increasing rate of the packing density of the non-woven fabric provide a good filtering efficiency and elongate the life time of a filter.

1 Claim, 2 Drawing Sheets

METHOD OF PRODUCING NON-WOVEN FABRICS FOR USE IN FILTERS

BACKGROUND OF THE INVENTION

The present invention relates to a non-woven fabric for use in a filter and a method for producing the non-woven fabric. In particular, the present invention relates to a non-woven fabric having an excellent filtering efficiency and a long lifetime, and a method for producing such non-woven fabric.

Recently, a non-woven fabric has come to be used as the filtering medium for an air filter, a filter for liquid material, etc. and the production of the non-woven fabric is increasing nowadays.

The non-woven fabric for use in a filter is preferred to have a large pore size at the inlet side (upstream side) and a small pore size at the outlet side (downstream side). To meet this requirement, it has been practiced to laminate a non-woven fabric having a larger pore size onto another non-woven fabric having a smaller pore size. However, in such a laminated non-woven fabric, since the pore size becomes discontinuously and abruptly decreased at the interface between the laminations, a solid matter to be filtered out tends to accumulate at the interface to lead to a pressure loss, thereby shortening the lifetime of a filter.

Alternatively, is proposed a method for controlling the pore size in which a sheet of non-woven fabric is subjected to calendering by being passed between a pair of rolls consisting of a metal roll and a metal roll coated with cotton, etc. (cotton roll) to produce a non-woven fabric having a relatively small pore size (greater packing density) on the side treated with the metal roll and a relatively large pore size (lesser packing density) on the side treated with the cotton roll. However, in a non-woven fabric so produced, although the packing density abruptly decreases from the surface treated with the metal roll towards the center of the non-woven fabric, a further decreasing in the packing density is little observed from the center to the surface treated with the cotton roll. In other words, the changing rate of the packing density is discontinuously and steeply changed at the vicinity of the center of the non-woven fabric. Therefore, a solid matter tends to accumulate at the vicinity of center, which is likely to cause a pressure loss to shorten the lifetime of the filtering medium.

OBJECT AND SUMMARY OF THE INVENTION

Accordingly, an object of the present invention is to provide a non-woven fabric for use as a filtering medium, which has a high filtering efficiency and an elongated lifetime. Another object of the present invention is to provide a method for producing such a non-woven fabric.

As a result of the intense research in view of the above objects, the inventors have found that it is important to gradually and continuously decrease the pore size from one surface to the other surface along the thickness direction in order to attain a high filtering efficiency and an elongated lifetime, and further found that in a non-woven fabric which is produced by calendering a stacked non-woven fabric consisting of two sheets of non-woven fabric by passing the stacked non-woven fabric between a pair of rolls and then separating the calendered stacked non-woven fabric into each sheet of non-woven fabric, the pore size is maximized (minimized packing density) on one side (stacking surface) and minimized (maximized packing density) on the other side (rolled surface), and the packing density changes gradually from one surface to the other surface along the thickness direction of the sheet of non-woven fabric.

Thus, in a first aspect of the present invention, there is provided a non-woven fabric for filtering medium, comprising randomly oriented thermoplastic resin fibers, wherein the packing density in the thickness direction of said non-woven fabric gradually increases from one surface to the other surface of the non-woven fabric.

In a second aspect of the present invention, there is provided a method of producing the non-woven fabric as defined above, which comprises the steps of mechanically stacking two sheets of non-woven fabric to be calendered; calendering the stacked sheet by passing at a feeding speed of 1–50 m/min said stacked sheet between a pair of rolls held at a temperature of 50°–150° C. and having a roll gap of 5–95% of the thickness of said stacked sheet; and separating the calendered stacked sheet to individual two sheets of said non-woven fabric.

DETAILED DESCRIPTION OF THE INVENTION

Figure 1:
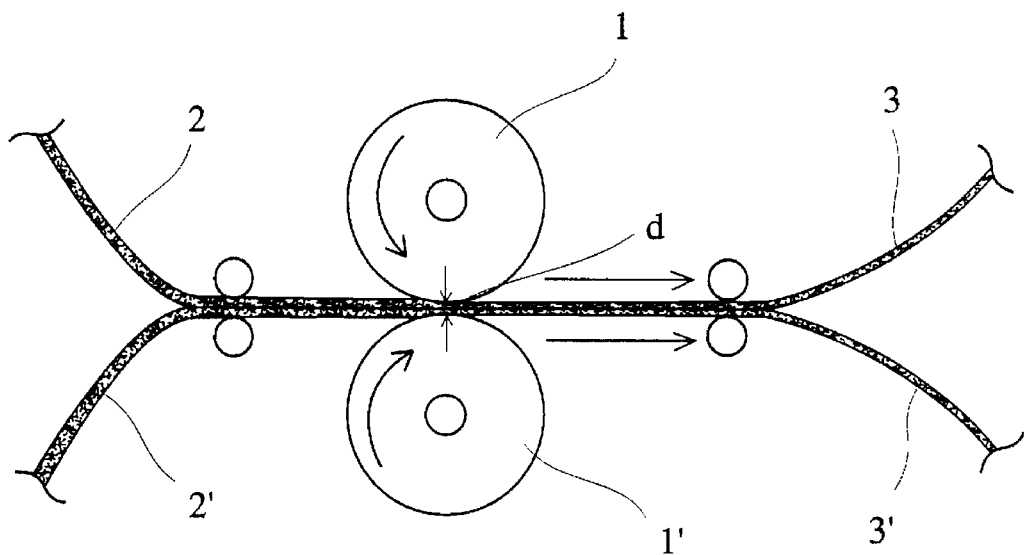
FIG. 1 is a schematic view showing a production process for producing the non-woven fabric of the present invention.

The present invention will be described below more in detail.

[1] Non-woven fabric

The thermoplastic resin for constituting the non-woven fabric of the present invention is not critically restricted, and may include polyolefin such as polyethylene, polypropylene, etc., polyester such as polyethylene terephthalate, polybutylene terephthalate, etc., polyamide such as nylon 6, nylon 66, nylon 46, etc., and other polymers such as polyvinyl chloride, polyvinylidene chloride, polystyrene, polycarbonate, polyvinylidene fluoride, etc. In particular, polyolefin and polyamide are preferable.

In the non-woven fabric of the present invention comprising randomly oriented fibers of the thermoplastic resin as exemplified above, the packing density gradually increases along the thickness direction from one surface (loosely packed surface) to the other surface (tightly packed surface). The packing density referred to herein is defined by the ratio of the apparent density of the non-woven fabric to the density of the resin constituting the non-woven fabric. For example, the packing density is 5–15% near the loosely packed surface (usually the upstream surface with respect to the flow path of liquid to be filtered) and 20–55% near the tightly packed surface (usually the downstream surface). The difference in the packing density between the tightly packed surface and the loosely packed surface is preferably 5–50%, more preferably 20–40%. The average packing density of the non-woven fabric of the present invention is preferably 5–50%, more preferably 10–30%.

The increasing rate of the packing density, which is defined by the gradient (differential coefficient) of the packing density curve with respect to the distance (mm) from the loosely packed surface, is preferably 2–150, more preferably 10–80. A non-woven fabric having an increasing rate lower than 2 is insufficient for filtering a liquid containing solid matters of wide particle size distribution because the density gradient is too small. On the other hand, an increasing rate larger than 150 results in a steep change in the pore size, thereby failing to represent the effect of providing a density gradient.

The non-woven fabric of the present invention is preferred to have the following additional characteristics:

(1) Initial Efficiency: 50–99.9%, more preferably 70–99.9%, and (2) Life: 500 cc·2 kgf/cm² or more, more preferably 1000 cc·2 kgf/cm².

The initial efficiency is represented by the ratio of the decrease in turbidity by passing through a filter made of the non-woven fabric to the initial value of turbidity of a liquid. The life is represented by the total volume of a liquid passing through a unit surface area (cm²) of the filter until the pressure loss reaches 2 kgf. Therefore, the larger the initial efficiency and the life, the more efficient the filter and the lower the pressure loss.

[2] Production method

The non-woven fabric of the present invention can be basically produced by calendering a mechanically stacked sheet consisting of two sheets of non-woven fabric.

The non-woven fabric to be subjected to calendering is not practically restricted as long as made of the thermoplastic resin exemplified above, and produced by a known method such as melt blow method, etc. A melt-blown non-woven fabric may be subjected to various pre-treatments such as usual calendering, heat setting, etc. The non-woven fabric to be subjected to calendering of the present invention is preferred to have a basis weight of 150–300 g/m², a thickness of 2–6 mm, a fiber diameter of 4 μm or less, and an average packing density throughout the fabric of 5–15%.

The stacked sheet of non-woven fabric described above is subjected to calendering by a calendering apparatus, for example, as shown in FIG. 1. In FIG. 1, the calendering apparatus has a pair of hard rolls 1 and 1' (metal roll, for example). Two sheets of non-woven fabric 2 and 2' are stacked each other and the resulting stacked sheet is passed between the pair of rolls 1 and 1' to be calendered. The calendered stacked sheet is then peeled form the interface of the two non-woven fabric layers to give two separated sheets of the non-woven fabric 3 and 3' of the present invention. The roll gap (d) between the rolls 1 and 1' is 5–95%, preferably 10–40% of the thickness of the stacked sheet before calendering. The peeling method and peel angle are not restricted. At a roll gap exceeding 75%, a relatively low changing rate of the packing density can be obtained. Each of the non-woven fabric 3 and 3' after being passed through the rolls 1 and 1' having such a roll gap (d) has a thickness of 40–95% the thickness of the non-woven fabric 2 and 2'.

Each of the hard rolls 1 and 1' is independently held preferably at 50–150° C., more preferably 100–130° C. A temperature lower than 50° C. fails to provide a sufficient density gradient, while a temperature higher than 150° C. makes the pore size too small.

The feeding speed of the non-woven fabric is preferably 1–50 m/min, more preferably 3–10 m/min. A feeding speed lower than 1 m/min results in a poor productivity, and a feeding speed exceeding 50 m/min makes the operation difficult.

Figure 2:
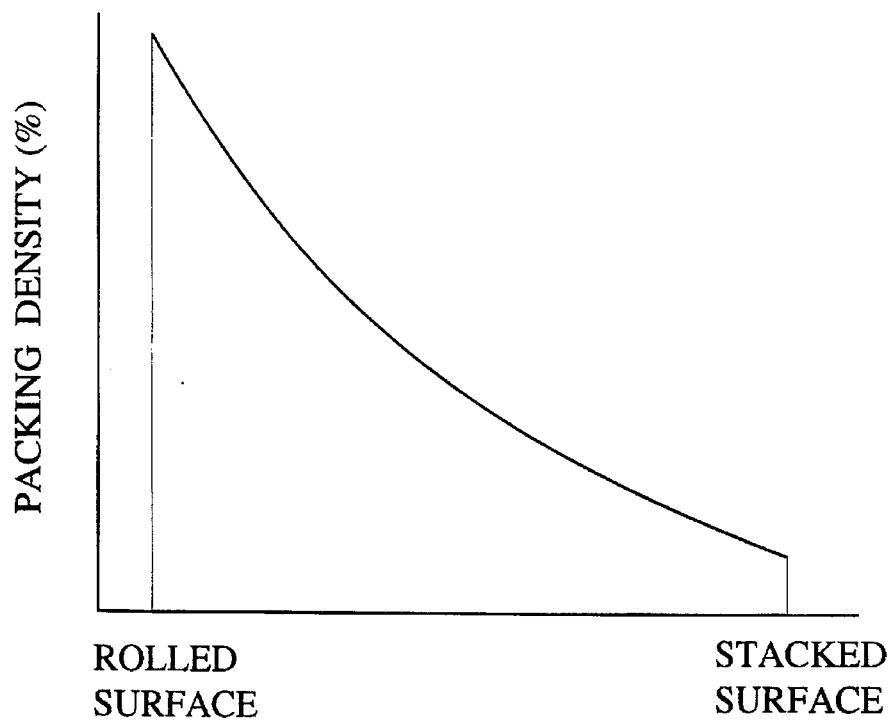
FIG. 2 is a graph showing the change of the packing density of the non-woven fabric produced by the method of the present invention.
Figure 3:
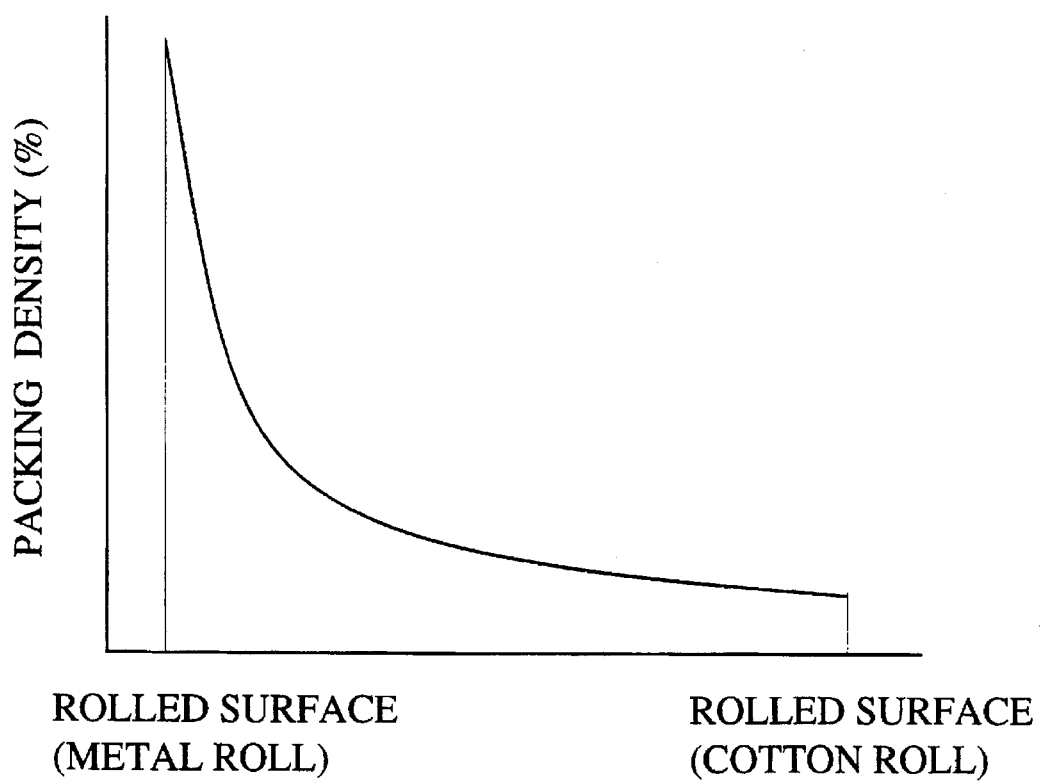
FIG. 3 is a graph showing the change of the packing density of the non-woven fabric produced by the conventional method using a pair of rolls consisting of a metal roll and a cotton roll.

In the present invention, since a stacked sheet of two non-woven fabric layers is calendered by being passed between a pair of metal rolls, the calendered non-woven fabric has the lowest packing density at the stacked surface and the highest packing density at the rolled surface. Further, the non-woven fabric produced by the method of the present invention has a nearly constant changing rate of packing density as shown in FIG. 2.

Although the reason why such a packing structure is obtained is not known, it may be recognized as follows. Generally, in a calendered single sheet of non-woven fabric, the packing density is maximized at both the rolled surfaces and gradually or abruptly decreased towards the center of the fabric along the thickness direction, i.e., the packing density reaches the lowest level at the center. In a stacked sheet consisting of two sheets of non-woven fabric, since the interface of the two sheets of non-woven fabric corresponds to the center portion of a single sheet of non-woven fabric, the packing density is highest at both the rolled surfaces and lowest at the interface. Namely, in the respective sheets in the stacked sheet, the packing density is highest at one surface (rolled surface) and gradually decreases towards the other surface (stacked surface) to reach the lowest packing density there.

The present invention will be further described while referring to the following Examples which should be considered to illustrate various preferred embodiments of the present invention.

In the following Examples and Comparative Examples, the following melt-blown non-woven fabrics made of polypropylene (average fiber diameter: 1.2 μm) were used.

|  | Basis Weight (g/m²) | Thickness (mm) | Gas Permeability (cc/cm²/sec) | Maximum Pore Size (μm) |
| --- | --- | --- | --- | --- |
| PPnw-1 | 250 | 4.26 | 4.5 | 25 |
| PPnw-2 | 30 | 0.08 | 2.9 | 13 |
| PPnw-3 | 30 | 0.16 | 14.1 | 18 |
| PPnw-4 | 30 | 0.24 | 23.4 | 27 |
| PPnw-5 | 40 | 0.32 | 17.6 | 27 |

Each of the properties of the non-woven fabric was measured or calculated as follows.

(1) Gas Permeability: Measured according to JIS L1096 using a Frasil test machine.

(2) Maximum Pore Size: Measured according to ASTM E-128 using a maximum pore size measuring apparatus.

(3) Packing Density: Calculated by dividing the apparent density of the non-woven fabric, which was calculated from the measured values of the basis weight and thickness, by the density of resin constituting the non-woven fabric.

(4) Initial Efficiency: The turbidity ($\tau$) of a fluid before and after filtering was calculated from the following equation:

$$\tau = (1/L) \times ln(I_o/I)$$

wherein $I_o$ is the intensity of incident light, I is the intensity of transmitted light, and L is the optical path. The initial efficiency was calculated from the following equation:

$$\text{Initial Efficiency } (\%) = (\tau_{in} - \tau_{out})/\tau_{in} \times 100$$

wherein $\tau_{in}$ and $\tau_{out}$ are turbidities before and after filtering, respectively.

EXAMPLES 1–4

A stacked sheet consisting of two sheets of melt-blown non-woven fabric (PPnw-1) having an average packing density of 6.7% and an initial efficiency of 29% was calendered by being passed between a pair of metal rolls under the condition (roll temperature, roll gap, and feeding speed) shown in Table 1. The calendered stacked sheet was then peeled to obtain two sheets of non-woven fabric of the present invention.

The properties of the non-woven fabric thus produced are shown in Table 1.

TABLE

|  | Example 1 | Example 2 | Example 3 | Example 4 |
| --- | --- | --- | --- | --- |
| Production Conditions | | | | |
| Non-Woven Fabric | PPnw-1 | PPnw-1 | PPnw-1 | PPnw-1 |
| Roll Temperature (°C.) | 80 | 80 | 110 | 110 |
| Roll Gap (mm) | 1.5 | 0.8 | 1.5 | 0.8 |
| Feeding Speed (m/min) | 3 | 3 | 3 | 3 |
| Properties | | | | |
| Thickness (mm) | 2.14 | 1.43 | 1.85 | 1.12 |
| Gas Permeability (cc/cm²/sec) | 1.9 | 1.1 | 1.4 | 0.7 |
| Maximum Pore Size (μm) | 14 | 9 | 11 | 7 |
| Packing Density (%) | | | | |
| outlet side | 21.5 | 29.6 | 24.8 | 31.6 |
| inlet side | 13.0 | 14.3 | 14.0 | 15.0 |
| average | 13.6 | 20.6 | 15.2 | 24.7 |
| Initial Efficiency (%) | 57 | 64 | 62 | 77 |
| Life (cc · 2 kgf/cm²) | 1100 | 900 | 730 | 550 |

COMPARATIVE EXAMPLES 1-3

A laminated non-woven fabric of a basis weight of 250 g/m² was produced by laminating 8 sheets of melt-blown non-woven fabrics (PPnw-2 to PPnw-5) each having a basis weight of 30–40 g/m² and made of fibers having the same fiber diameter as that of PPnw-1. The properties of the laminated non-woven fabric are shown in Table 2.

TABLE 2

|  | Comparative Example 1 | Comparative Example 2 | Comparative Example 3 |
| --- | --- | --- | --- |
| Number of laminated non-woven fabric sheets | | | |
| PPnw-2 | 2 | 1 | 0 |
| PPnw-3 | 2 | 3 | 4 |
| PPnw-4 | 3 | 3 | 3 |
| PPnw-5 | 1 | 1 | 1 |
| Properties | | | |

TABLE 2-continued

|  | Comparative Example 1 | Comparative Example 2 | Comparative Example 3 |
| --- | --- | --- | --- |
| Thickness (mm) | 1.46 | 1.57 | 1.75 |
| Gas Permeability (cc/cm²/sec) | 0.9 | 1.1 | 1.5 |
| Maximum Pore Size | 9 | 12 | 13 |
| Packing Density (%) | | | |
| outlet side | 42.1 | 42.1 | 21.1 |
| inlet side | 14.0 | 14.0 | 14.0 |
| average | 19.4 | 17.7 | 15.7 |
| Initial Efficiency (%) | 63 | 55 | 50 |
| Life (cc · 2 kgf) | 600 | 750 | 980 |

As can be seen from the above results, the non-woven fabric of Examples 1–4 showed good initial efficiency and in particular high values of life as compared with the non-woven fabric of Comparative Examples 1–3.

As described above, in the present invention, since a stacked sheet of two non-woven fabric layers is calendered by being passed between a pair of metal rolls, each of the stripped non-woven fabrics has the lowest packing density at the stacked surface and the highest packing density at the rolled surface. In addition, the changing rate of the packing density in the thickness direction is relatively low and nearly constant. The non-woven fabric of the present invention is suitable for use in filters such as electric battery separator, heat-resistant filter, etc.

What is claimed is:

1. A method for producing a filtering medium which comprises randomly oriented thermoplastic resin fibers and has a density gradient from one surface to the other surface along a thickness direction of said filtering medium, which method comprises the steps of:

stacking two sheets of non-woven fabric to be calendared;

calendaring the stacked sheets by passing at a feeding speed of 1–50 m/min said stacked sheets between a pair of rolls held at a temperature of 50°–130° C. and having a roll gap of 5–95% of the thickness of said stacked sheet so that the calendered stack has a packing density of 20–55% at a rolled surface and a packing density of 5–15% at a stacked surface between said two sheets of non-woven fabric, said packing density being defined as the ratio of the apparent density of said filtering medium to the density of said thermoplastic resin; and separating the calendered stacked sheet to respective two sheets of said non-woven fabric.

* * * * *